United States Patent [19]

Gibbs

[11] 4,280,549

[45] Jul. 28, 1981

[54] APPARATUS AND PROCESS FOR DIE-CASTING

[75] Inventor: Stephen Gibbs, Nielston, Scotland

[73] Assignee: Keystone International, Inc., Houston, Tex.

[21] Appl. No.: 27,886

[22] Filed: Apr. 6, 1979

[30] Foreign Application Priority Data

Apr. 8, 1978 [GB] United Kingdom ............. 13876/78

[51] Int. Cl.³ .............................................. B22D 17/22
[52] U.S. Cl. .................................... 164/113; 164/131; 164/303; 164/347; 249/59; 264/334; 425/438; 425/444; 425/DIG. 58
[58] Field of Search .............. 164/344, 345, 347, 113, 164/131, 303; 249/59; 425/438, DIG. 58, 444; 264/334

[56] References Cited

U.S. PATENT DOCUMENTS

| 634,107 | 10/1899 | Gray | 249/59 X |
|---|---|---|---|
| 3,481,000 | 12/1969 | Bärfuss | 425/438 X |
| 3,719,446 | 3/1973 | Cleevely | 425/438 X |
| 4,059,249 | 11/1977 | Galer | 249/59 X |
| 4,139,176 | 2/1979 | Wündsch | 164/345 X |

Primary Examiner—Robert D. Baldwin
Assistant Examiner—J. Reed Batten, Jr.
Attorney, Agent, or Firm—Browning, Bushman & Zamecki

[57] ABSTRACT

Apparatus and method for producing a die cast article, such as a gear wheel having helical teeth, in which the die cavity is defined by fixed elements and a rotatable element. On completion of the casting the cast article can be ejected from the casting cavity on relative rotation between the fixed elements and rotatable element so that the cast helical teeth of the article can be removed in an undamaged condition.

14 Claims, 2 Drawing Figures

APPARATUS AND PROCESS FOR DIE-CASTING

The invention relates to an apparatus and process for die-casting.

Die-casting has the advantage that components of complex form, such as gear wheels, can be formed quickly and economically. Die-casting of gear wheels having straight-cut teeth presents no special problems but it has not hitherto been possible to die-cast gear wheels with helical teeth because it is almost impossible to extract such gear wheels from a normal die by standard methods without damage to the teeth. Accordingly, it has been necessary to form helical-toothed gear wheels by casting an untoothed blank and machining the teeth; this process is much more expensive than straight-forward die-casting.

The present invention seeks to provide an apparatus and process of die-casting which can be used to produce helically toothed gear wheels.

According to the present invention there is provided die-casting apparatus comprising a fixed die member and a movable die member which together define a casting cavity therebetween, and expulsion means for ejecting a formed casting from the cavity on relative rotational movement between the fixed and movable die members.

According to a further aspect of the invention there is provided a process for die-casting comprising bringing a fixed die member and a movable die member together to define a casting cavity therebetween;

injecting a moulding material into said cavity thereby forming a casting;

and permitting relative rotational movement between the fixed die member and movable die member on expulsion of the casting from the die.

Finally the invention extends to a casting produced by the process of the invention.

It is preferred that, in the process of the invention, the casting whose shape is defined by the two die members be a gear wheel having helical teeth. It will be appreciated that, when the expulsion means are operated to expel such a gear wheel from the die, the movable die member thereof will rotate relative to the fixed die member, thereby enabling the helical teeth of the gear wheel to emerge from the die without damage.

An embodiment of the invention will now be described, by way of example, with reference to the accompanying drawings in which.

Figure 1:
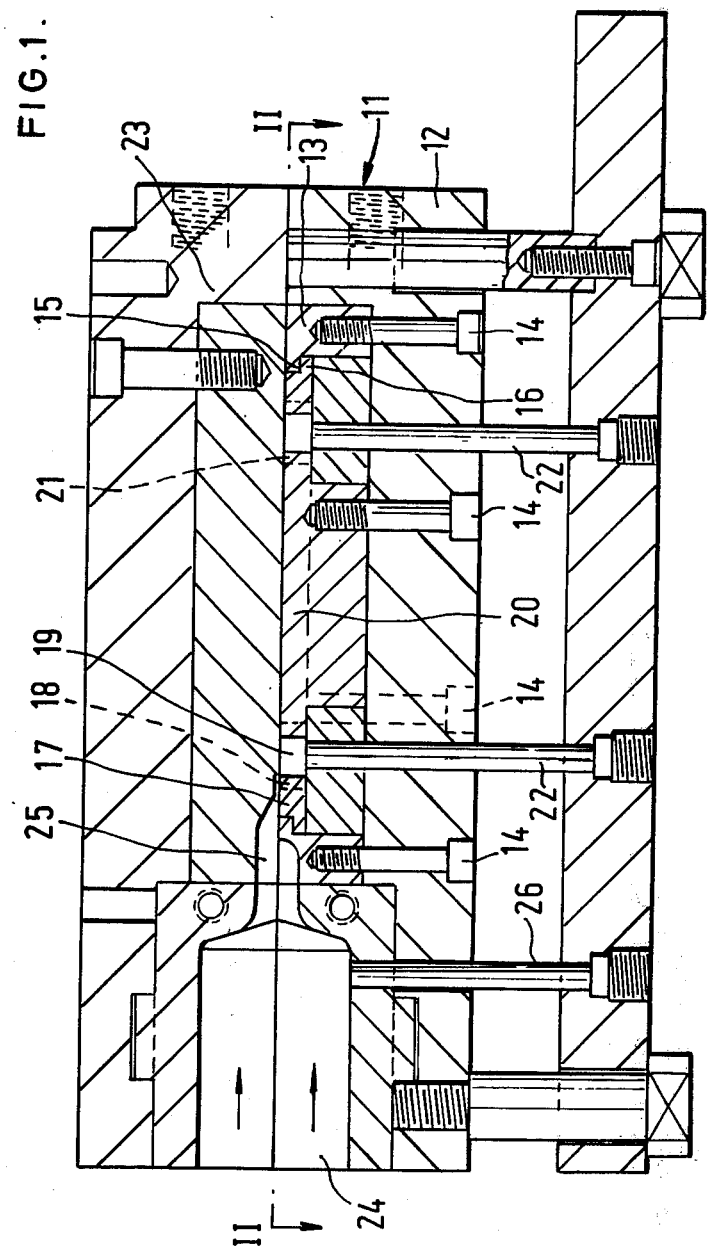
FIG. 1 is a sectional view of a die in accordance with the present invention.
Figure 2:
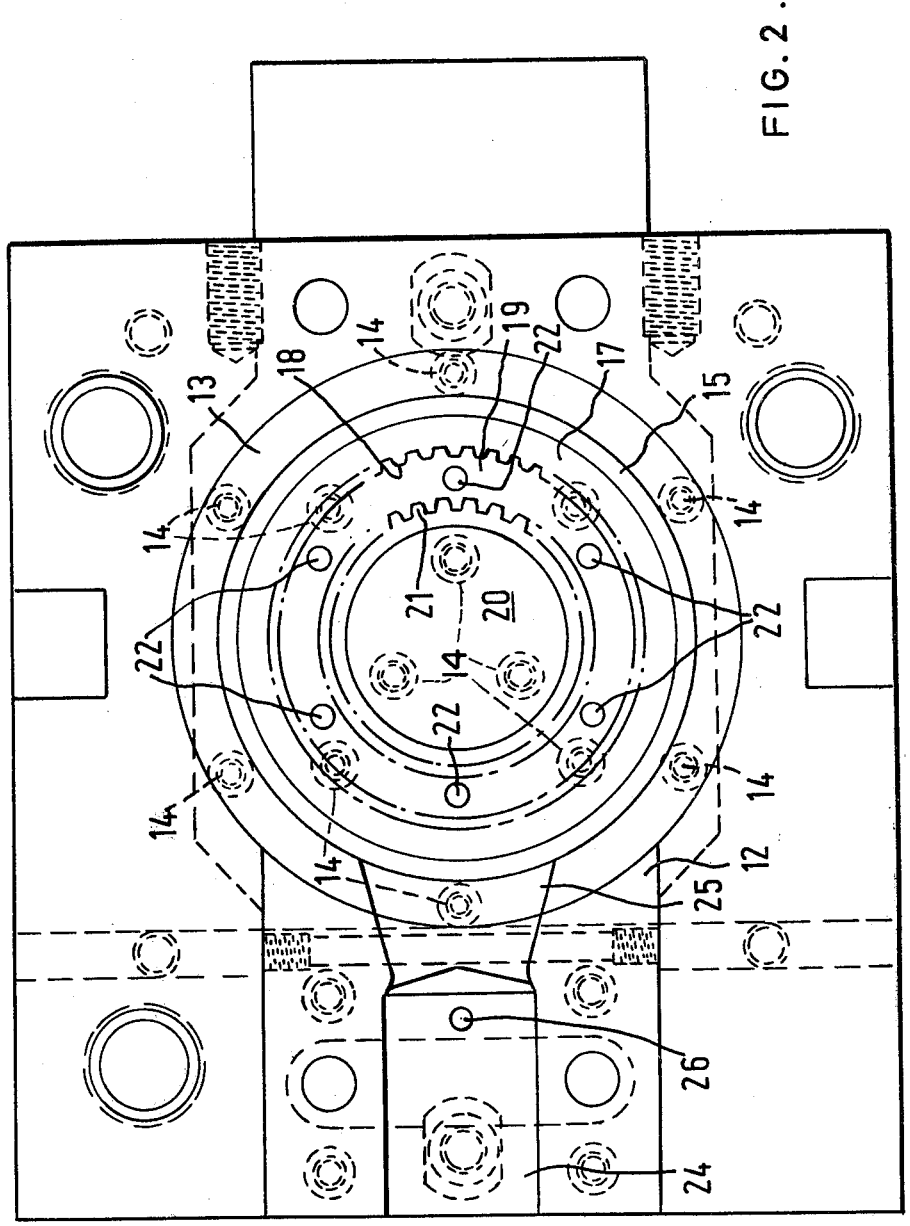
FIG. 2 is a plan view on the line II—II of FIG. 1.

Referring to the drawings, a pair of half-dies includes a fixed half-die indicated generally by the reference numeral 11. The fixed half-die 11 has a base portion 12 to which a retaining ring 13 is secured by means of bolts 14. The retaining ring 13 has an annular lip 15 which co-operates with a lip 16 formed on a rotatable ring 17. The rotatable ring 17 is formed internally with helical teeth 18 which define the radially outer periphery of a casting cavity 19. The radially inner periphery of the casting cavity 19 is defined by a central circular member 20 having straight cut teeth 21 formed on its outer periphery. Thus a gear wheel can be cast in the cavity 19, the gear wheel having straight internal teeth and helical external teeth formed by the teeth on the circular member 20 and rotatable ring 17 respectively.

The fixed half-die 11 is provided with a plurality of ejector pins 22 whereby the casting can be ejected from the die by upward movement of the pins 22 eg. by means of a ram (not shown).

A movable half-die 23 is mounted on top of the fixed half-die 11 and when in this position to close the casting cavity 19, the two half dies define a metal feed inlet 24 whereby casting metal can be fed through channel 25 into the casting cavity 19. One or more ejector pins 26 extend into the inlet 24.

In operation of the apparatus in accordance with the invention, the two half-dies 11 and 23 are brought together so as to define the enclosed casting cavity 19. A moulding material (preferably aluminium, zinc or brass) is then introduced through inlet 24 and channel 25 into cavity 19 and allowed to solidify, thereby forming the casting. After solidification is complete, the half-die 23 is removed from the half-die 11. Thereafter the ram is actuated to drive the ejector pins 22 and 26 upwardly and expel the casting from the fixed half-die 11. As the casting is thus expelled, the rotatable ring 17, rotates about its central vertical axis relative to the retaining ring 13, thus allowing the casting to leave the half-die 11 without damage to the helical external teeth of the casting.

The apparatus and method of the invention is especially useful for casting the annular member of the transmission assembly described in co-pending Patent Application Ser. No. 027,885, filed Apr. 6, 1979, in the name of Stephen Gibbs.

Although the above description relates to the production of a gear wheel having helical teeth on its radially outer periphery and straight teeth on its radially inward periphery, it will be readily apparent that helical teeth could be provided on the inner periphery and straight teeth on the outer periphery. In this case the member defining the radially inward wall of the casting cavity would be movable and the radially outer wall fixed. Also other alternatives are possible. For example a gear wheel can be envisaged in which helical teeth are provided internally or externally of the gear wheel, the other edge having no teeth.

I claim:

1. Die-casting apparatus comprising a fixed die member and a movable die member rotatable relative to said fixed die member which together define a circular casting cavity having a substantially helical formation on at least one radial periphery and expulsion means disposed to move into and through said cavity for ejecting a formed casting having said helical formation thereon from the cavity in a direction substantially parallel to the cavity axis, expulsion of said casting resulting in relative rotational movement between the fixed die member and movable die member.

2. Apparatus as claimed in claim 1, in which the fixed and movable die members define an annular casting cavity.

3. Apparatus as claimed in claim 1, in which the movable die member comprises an annular element defining helical teeth around its periphery whereby an annular gear having helical teeth can be cast in the cavity and ejected from the die.

4. Apparatus as claimed in claim 3, in which the movable die member defines the radially outward periphery of the casting cavity.

5. Apparatus as claimed in claim 3, in which the movable die member defines the radially inward periphery of the casting cavity.

6. Apparatus as claimed in claim 4, in which the fixed die member comprises an annular element defining straight teeth around its periphery.

7. Apparatus as claimed in claim 5, in which the fixed die member comprises an annular element defining straight teeth around its periphery.

8. Apparatus as claimed in claim 1, in which the fixed die member comprises a first portion and a second portion releasably securable thereto.

9. A process for die-casting comprising bringing a fixed die member and a movable die member rotatable relative to said fixed die member together to define a circular casting cavity having a substantially helical formation on at least one radial periphery;
injecting a molding material into said cavity thereby forming a casting having said helical formation thereon; and
moving an expulsion means into and through said cavity for expelling the casting from the die in a direction substantially parallel to the cavity axis whereby expulsion of the casting from the die results in relative rotational movement between the fixed die member and movable die member.

10. A process as claimed in claim 9, in which the fixed and movable die members define an annular casting cavity.

11. A process as claimed in claim 9, comprising forming as the casting a gear wheel having helical teeth on its radially inward periphery.

12. A process as claimed in claim 9, comprising forming as the casting a gear wheel having helical teeth on its radially outward periphery.

13. A process as claimed in claim 11, comprising forming the gear wheel with straight teeth on its radially outward periphery.

14. A process as claimed in claim 12, comprising forming the gear wheel with straight teeth on its radially inward periphery.

* * * * *